United States Patent
Lüken

(10) Patent No.: US 7,302,495 B2
(45) Date of Patent: Nov. 27, 2007

(54) METHOD FOR TRANSMITTING SIGNALING MESSAGES USING ALTERNATE PATH

(75) Inventor: Joachim Lüken, München (DE)

(73) Assignee: Siemens Aktiengesellschaft, Munich (DE)

( * ) Notice: Subject to any disclaimer, the term of this patent is extended or adjusted under 35 U.S.C. 154(b) by 496 days.

(21) Appl. No.: 10/498,581

(22) PCT Filed: Dec. 3, 2002

(86) PCT No.: PCT/EP02/13671

§ 371 (c)(1),
(2), (4) Date: Jun. 10, 2004

(87) PCT Pub. No.: WO03/051065

PCT Pub. Date: Jun. 19, 2003

(65) Prior Publication Data

US 2005/0220078 A1    Oct. 6, 2005

(30) Foreign Application Priority Data

Dec. 10, 2001  (EP)  ................... 01129453

(51) Int. Cl.
*G06F 15/173* (2006.01)
*G06F 15/177* (2006.01)
*H04L 12/66* (2006.01)
*H04M 7/00* (2006.01)

(52) U.S. Cl. ............ 709/239; 709/220; 370/352; 370/467; 379/229

(58) Field of Classification Search .............. None
See application file for complete search history.

(56) References Cited

U.S. PATENT DOCUMENTS

| 6,301,352 | B1 * | 10/2001 | Chung et al. | 379/229 |
| 6,327,260 | B1 * | 12/2001 | McGrew | 370/385 |
| 6,680,952 | B1 * | 1/2004 | Berg et al. | 370/467 |
| 6,992,974 | B1 * | 1/2006 | Tripathi | 370/216 |
| 7,120,139 | B1 * | 10/2006 | Kung et al. | 370/352 |
| 2005/0129004 | A1 * | 6/2005 | Clevenger | 370/352 |

FOREIGN PATENT DOCUMENTS

| EP | 1 089 517 A | 4/2001 |
| GB | 2 352 361 A | 1/2001 |
| WO | WO 01/10140 | 2/2001 |

OTHER PUBLICATIONS

Huitema C. et al, "An Architecture for Residential Internet Telephony Service", IEEE Network, IEEE Inc., New York, USA, vol. 13, No. 3, May 1999, pp. 50-56, XP000870631.

Salman M. A. et al., "The Future of IP-PSTN Iterworking", 38th European Telecommunications Congress, Proceedings Networking the Future, Utrecht, NL, Aug. 24-28, 1999, London: IBTE, GB, pp. 163-167, XP000847190.

* cited by examiner

*Primary Examiner*—Wen-Tai Lin

(57) ABSTRACT

The invention relates to a method, according to which useful data is transmitted between an interconnected data transmission network and a data package transmission network. A receiver of an original signaling message generates a partner signaling message, which has been defined for a data package transmission and is suitable for transporting the original signaling message. The partner signaling message however does not contain the original signaling message, as it is withheld.

15 Claims, 3 Drawing Sheets

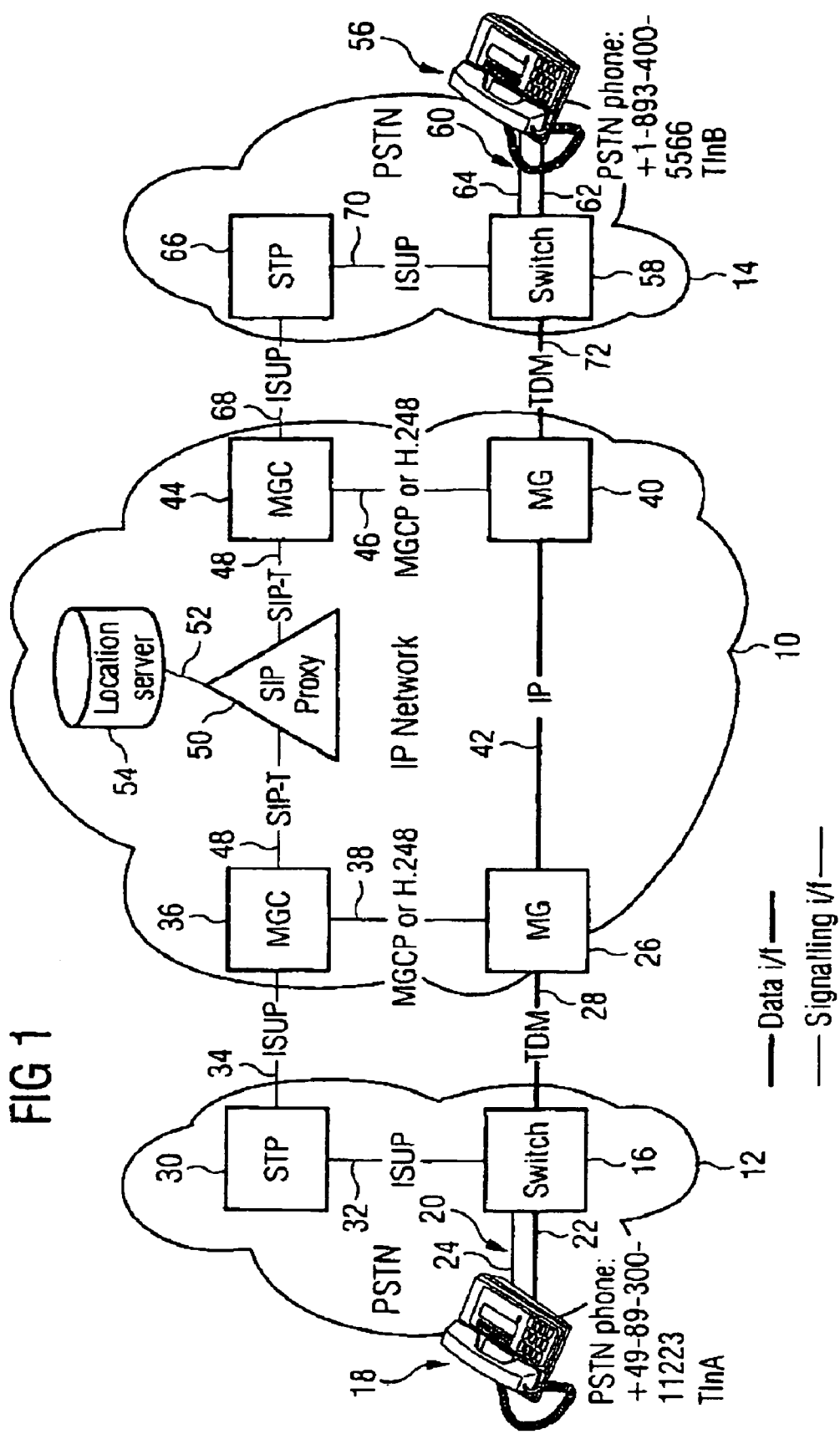

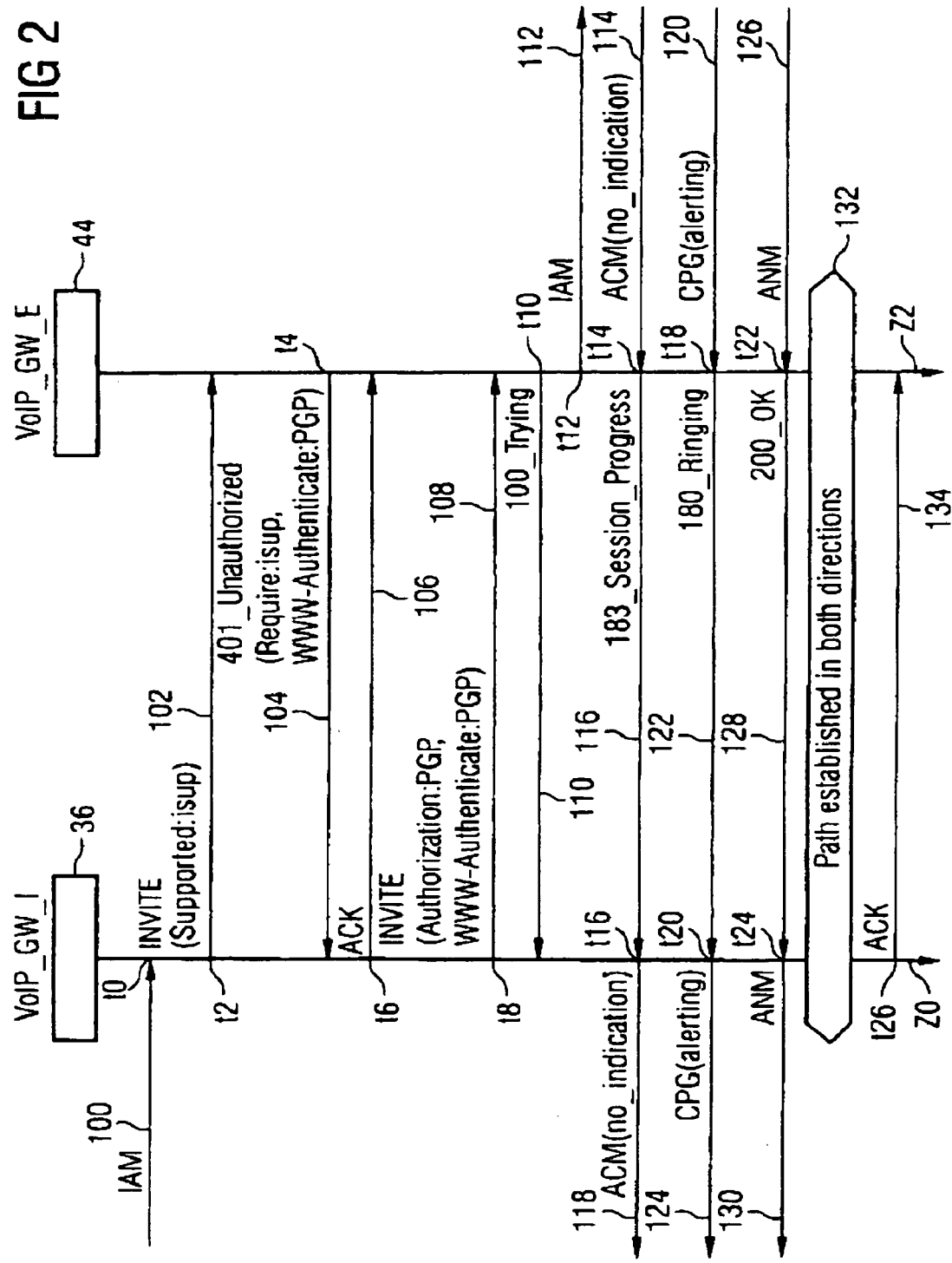

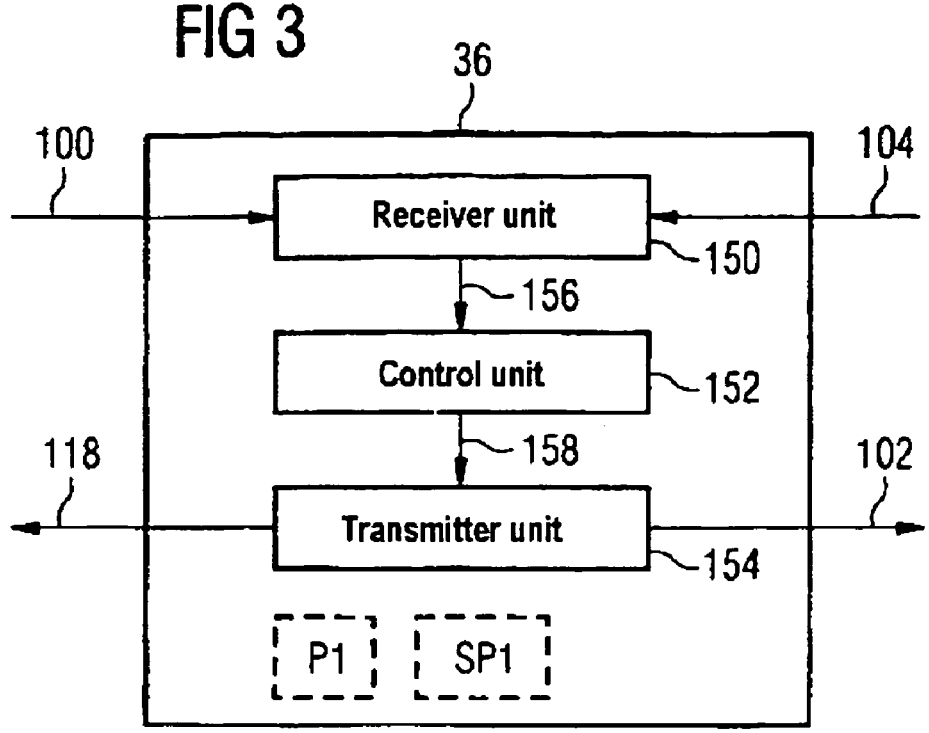
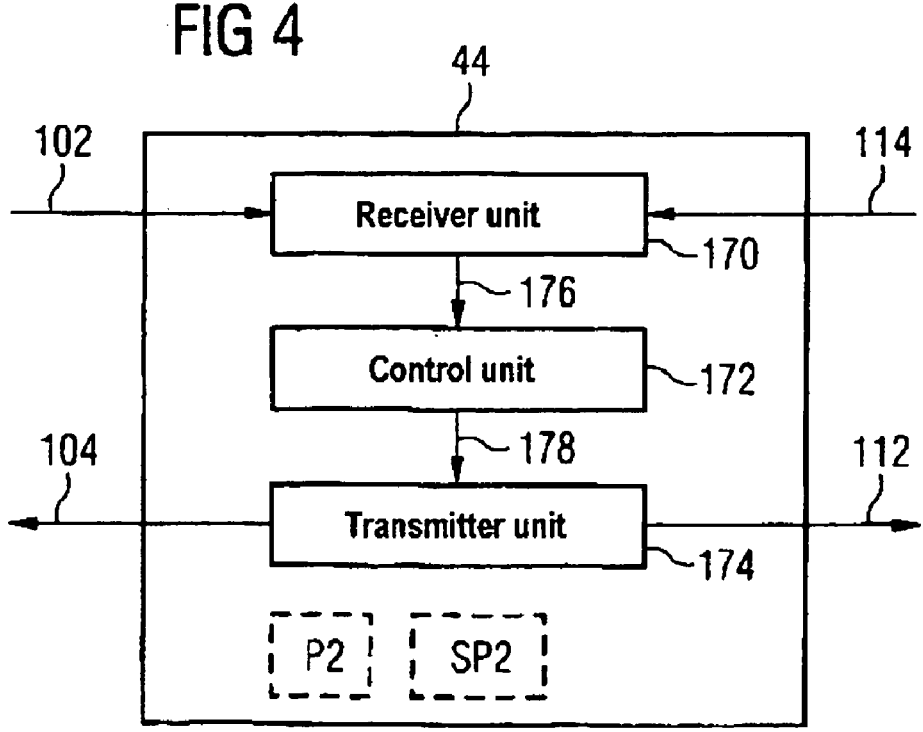

METHOD FOR TRANSMITTING SIGNALING MESSAGES USING ALTERNATE PATH

CROSS REFERENCE TO RELATED APPLICATIONS

This application is the U.S. National Stage of International Application No. PCT/EP02/13671, filed Dec. 3, 2002 and claims the benefit thereof. The International Application claims the benefits of European application No. 01129453.5 filed Dec. 10, 2001, both of the applications are incorporated by reference herein in their entirety.

FIELD OF INVENTION

The invention relates to a method whereby user data is transmitted between an interconnected data transmission network and a data packet transmission network. An original signaling message containing signaling data for data transmission is defined for an interconnected data transmission network. A partner signaling message, defined for data packet transmission and suitable for transporting the original signaling message, is generated for the received original signaling message and is transmitted,

BACKGROUND OF INVENTION

A method of this kind is, for example, known from the draft of IETF (Internet Engineering Task Force) "SIP for Telephones (SIP-T): Context and Architectures". According to this draft, the original signaling message should be accepted in an encapsulated form, a sit is called, in the partner signaling message. This should enable a transparent forwarding of the signaling data, i.e. forwarding without changing the original data structure of the original signaling message, or forwarding that a possible without knowing the significance of the individual data fields of the original signaling message.

According to SIP-T, section 3.2.3, "proxy", a signaling unit that receives the partner signaling message and cannot process the encapsulated signaling data of the interconnected data transmission network should ignore this signaling data.

The object of the invention is to enable the transmission of signaling data using a simple method, that particularly precludes the misuse of signaling data. Furthermore, corresponding devices, a corresponding signaling message and a corresponding program should be provided.

SUMMARY OF INVENTION

The object related to the method is achieved by the independent claims. Developments are given in the dependent claims.

The invention is based on the consideration that in accordance with SIP-T the partner signaling message originates from a network transfer unit or a control unit for a network transfer unit and that in the network transfer unit sending the partner signaling message it is not always known whether the destination of the signaling is another network transfer unit or an IP user (Internet protocol), i.e. a user that operates a terminal device on the Internet. Furthermore, the invention is based on the consideration that the original signaling message can contain signaling data which where possible should not be forwarded to an end user. For example, such signaling data refers to a call number of the calling user that in accordance with a performance feature of the interconnected transmitting network is not to be shown to the receiver. There is, however, much further information that should not be made known to an end user, because the end user could use the information to disturb the signaling or to avoid a charge.

Furthermore, the invention is based on the consideration that, particularly with inter-domain data transmission, it is not possible using the destination call number to detect that the final destination of the signaling message is an IP user or a network transfer unit, through which the user of the interconnected data transmission network can be reached.

Therefore, with the method in accordance with the invention, in addition to the steps of the method named in the introduction, the original signaling message is not contained in the partner signaling message even though the partner signaling message is suitable for transmission of the original signaling message. In other words, the original signaling message is withheld to prevent misuse. The original signaling message is then not forwarded until it is determined that no subscriber line in the data packet transmission network is the direct receiver.

The original signaling message corresponds to a signaling message such as is also used for signaling in data transmission, whereby the user data is exclusively transmitted in an interconnected data transmission network. With one embodiment for the transmission of user data, the partner signaling message has the same signaling function as the original signaling message. For example, the original signaling message and partner signaling message are connection setup messages.

In a development of the method in accordance with the invention, the original message is a message in accordance with the ISUP standard and/or in accordance with a standard based on the ISUP standard, with ISUP being the abbreviation for ISDN (Integrated Services Digital Network) User Part. The core of the ISUP standard has been specified in standard Q.761 to Q.765 of the ITU-T (International Telecommunication Union-Telecommunication Sector). Telephone networks that operate according to the ISUP standard are particularly widespread in Europe.

The original signaling message is either alternatively or cumulatively a connection setup message. In accordance with the ISUP standard, the first connection setup message is also known as the IAM (Initial Address Message). The signaling data in the case of a connection setup message particularly contains a destination signal for the destination of the data transmission and an origin signal for the transmitter of the user data to be transmitted.

In another development of the method in accordance with the invention, a response message is received that has been generated as a response to the partner signaling message. Depending on the content or type of the response message, the original signaling message is transmitted via the data packet transmission network, or the transmission of the original signaling message via the data transmission network is suppressed, for example the buffer-stored original signaling message is discarded or deleted.

With a further development of the method in accordance with the invention, the partner signaling message and/or the response message is a message in accordance with the SIP protocol (Session Initiation Protocol) that has been defined by the IETF (Internet Engineering Task Force) in standard RFC 2543 or RFC 2543bis. In one embodiment, the partner signaling message is a communication setup message. In accordance with SIP, connection setup messages are designated invite messages.

In a further development in accordance with the invention, the partner signaling message receives a message element that indicates the participation of an interconnected data transmission network. In addition, the partner signaling message contains only the signaling data of the original signaling message that is necessary for signaling to a terminal device, but not all of the signaling data of the original signaling message. Transmitting the message element means that the receiver, in the case of a terminal of the data packet transmission network, can ignore the message element. A network transfer unit can, however, respond to the message element with a rejection message, because only encrypted signaling data should be transmitted. The use of a message element is a very simple way in which a distinction can be made between a terminal and a network transfer unit.

In a development of the method in accordance with the invention, a check is made, after receipt of the original signaling message and before transmitting the partner signaling message, to determine whether essential additional performance features of the interconnected data transmission network are requested in the original signaling message, that must be supported by the receiver of the partner signaling message, or whether such additional performance features are not requested. If essential additional performance features are not supported, clear-down is to take place.

Additional performance features are performance features that go beyond the steps absolutely necessary to set up a simple communication. For voice transmission, only the connection setup, the transmission of the user data and the connection disconnection are absolutely necessary. Examples of additional performance features are a call diversion, a call forwarding, a call number suppression or a closed user group.

Essential additional performance features are, for example, shown as such in the message itself, e.g. in a user-to-user element by a so-called Fla. Alternatively, the performance description of an additional performance feature can state that it is an additional essential performance feature. For example, the "closed user group" performance feature can be classified as an essential additional performance feature that must be supported.

Depending on the result of the check, the partner message receives, if no additional performance feature or only one inessential additional performance feature is requested, receives an indication that although essential additional services of the interconnected data transmission network are supported by the sender of the partner signaling message they need not be supported by the receiver of the partner signaling message. Otherwise, the partner signaling message receives an indication that the support of essential additional performance features of the interconnected data transmission network is also required in the receiver of the partner signaling message. For example, this distinction can occur when the SIP protocol is used, in that the message element indicating the participation of the interconnected data transition network is transmitted either as a supported parameter or as a required parameter.

In the next development, the response message is generated in a unit that supports no essential additional performance features of the interconnected data transmission network, for example in a terminal of the data packet transmission network, depending on the type of indication. If the support of essential additional performance features of the interconnected data transmission network, is necessary, clear-down takes place. Otherwise a connection is set up as standard, with no essential additional performance features being used.

In a unit that supports essential additional performance features of the interconnected data transmission network the response message is on the other hand generated independent of the type of indication, because this unit is able to provide the services appropriate to the essential additional performance features.

With the next development, a rejection message, by means of which the partner signaling message is rejected and thus the connection setup broken off, is generated as a response message in the unit that supports essential additional performance features of the interconnected data transmission network, depending on the message element. In one embodiment, the rejection message also contains a message element indicating the participation of an interconnected data transmission network. In a next embodiment, the rejection message contains an indication that the support of essential additional performance features of the interconnected data transmission network is absolutely necessary.

In a next development of the method in accordance with the invention at least one piece of security data for the performance of an encryption method is transmitted by the receiver of the partner signaling message to the sender of the partner signaling message, preferably in the response message or in a message following the response message. After receipt of the response message, a further partner signaling message is generated for the original signaling message and contain the original signaling message in an electronically encrypted form in accordance with the security data. The security data, for example, contains information on a version number of the encryption method, a name with the aid of which a public digital key can be determined, and/or a value for a so-called challenge-response method, that is designed to prevent so-called replay attacks.

With one embodiment the further partner signaling message is transmitted before the authorization of the receiver of the further partner signaling message to receive the original signaling message has been checked. This arrangement is based on the consideration that an unauthorized receiver cannot decrypt the encrypted signaling data because, for example, he does not have the private key necessary for the decryption. A check of the authorization before transmitting the further partner signaling message would therefore only slightly increase security. On the other hand, a pre-check of this kind would incur further additional message transmissions.

With a next development of the method in accordance with the invention, authorization data is transmitted by the sender of the partner signaling message to the receiver of the partner signaling message, preferably in the further partner signaling message. The authorization data is preferably first checked after receipt of the original signaling message and preferably still before decryption at the receiver of the further partner signaling message. Depending on the check, the original signaling message is decrypted and used for further signaling or the original signaling message is discarded. By means of this method, the original signaling message and the authorization data can be transmitted in one message.

With a next development of the method in accordance with the invention, security data that enables encryption to be performed is transmitted by the sender of the partner signaling message to the receiver of the partner signaling message. The receiver of the partner signaling message sends the sender of the partner signaling message a signaling message encrypted in accordance with the further security data and further defined for the interconnected data transmission network. In this way, signaling messages for the interconnected data transmission network are transmitted only in encrypted form in both transmission directions during the transmission via the data packet transmission network. This makes misuse substantially more difficult.

In a further development of the method in accordance with the invention, further authorization data is transmitted from the receiver of the partner signaling message to the sender of the partner signaling message, preferably together with the further signaling message. The further authorization data is checked. The further signaling message is either used for signaling or is discarded depending on the result of the check.

In a further development, the authorization data or the further authorization data contains a password and/or an electronic signature that is checked with the aid of an electronic encryption procedure. The inclusion of the authorization data or the further authorization data further increases protection against misuse.

The invention also relates to a device for the transmission of signaling data that transmits the partner signaling message. In developments, the device contains units that perform at least one method step related to the sender of the partner signaling message, in accordance with the method in accordance with the invention or of one of its developments.

The invention also relates to a device for receiving signaling data, particularly for receiving the partner signaling message. In developments, the device contains at least one unit that performs a method step, related to the receiver of the partner signaling message, of the method in accordance with the invention or one of its developments.

Furthermore, the invention relates to signaling messages that are exchanged by the method in accordance with the invention, particularly a signaling message that has been defined for a data packet transmission network and contains a message element that indicates the participation of an interconnected data transmission network.

Furthermore, the invention refers to a program with the aid of which the method steps related to the sender of the partner signaling message or the method steps related to the receiver of the partner signaling message are performed in accordance with the method according to the invention or one of its developments.

Accordingly, the aforementioned technical effects apply to the devices, the signaling message and the program.

BRIEF DESCRIPTION OF THE DRAWINGS

Examples of embodiments of the invention are explained in the following with the aid of drawings. The drawings are as follows.

FIG. 1 Interconnected data transmission networks connected to the Internet.

FIG. 2 Method steps to set up a connection, whereby the user data is transmitted from an interconnected data transmission network via the Internet again to an interconnected data transmission network.

FIG. 3 The construction of a control unit for an ingress network transfer unit.

FIG. 4 The construction of a control unit for an egress network transfer unit.

DETAILED DESCRIPTION OF INVENTION

FIG. 1 shows two interconnected data transmission networks 12 and 14 connected to the Internet 10, that belong to different network operators. With a different example of an embodiment, the interconnected data transmission networks 12 and 14 are, however, parts of the interconnected data transmission network of a single operator, for example of Deutsche Telekom AG.

The user data and the signaling data are transmitted in data packets on the Internet 10. At the lower protocol levels, the data is transmitted connectionless. In the interconnected data transmission networks 12 and 14 the data is, on the other hand, transmitted in transmission channels using a time-division multiplex method. The transmission is connection-oriented at all protocol levels.

The interconnected data transmission network 12 contains a switching center 16 to which a terminal 18 of a user TlnA is connected via an access line 20. On the access line 20 there is a user data transmission channel 22 and a signaling channel 24 in which signaling data, for example according to the subscriber signaling protocol DSS1 (Digital Signaling System No. 1), is transmitted. The terminal 18 is, for example, an ISDN (Integrated Service Digital Network) telephone with the call number 0049-89-30011223, i.e. the terminal 18 is located in Germany in the city of Munich.

The switching center 16 has a switching network (not illustrated) and a control unit (not illustrated). For example, the switching center 16 is a type EWSD (Electronic Digital Switching System) from Siemens AG.

The voice data is transmitted from the switching center 16, involving other switching centers as necessary, to a so-called ingress network transfer unit 26, i.e. a network transfer unit at the calling user's end TlnA. A transmission path 28 on which the user data is transmitted in time channels using time-division multiplexing lies between the switching center 16 and the network transfer unit 26.

To set up the connection, the switching center 16 must perform signaling in accordance with ISUP (ISDN User Part). Other switching centers and a forwarding unit 30, also designated an STP (Signaling Transfer Point), may, for example, also be involved. Between the switching center 16 and the forwarding unit 30 is a signaling path 32 in which the signaling data is transmitted, also using time-division multiplexing.

The forwarding unit 30 forwards the signaling data via a signaling path 34 to a control unit 36 in accordance with ISUP. The control unit 36 is allocated to the network transfer unit 26 and, together with the network transfer unit 26, forms a network transfer function. The steps of the method performed in the control unit 36 are explained in more detail with reference to FIG. 2.

The MGCP (Media Gateway Control Protocol) or the protocol in accordance with H.248 is, for example, used to control the network transfer unit 26. The MGCP has been defined in the RFC (Request for Comment) 2705 of the IETF (Internet Engineering Task Force). The H.248 protocol has been defined by the ITU-T (International Telecommunication Union—Telecommunication Sector). However, it is also possible to use other protocols for control.

In the Internet 10, the user data coming from the user TlnA is transmitted, in accordance with the Internet Protocol (IP), to a so-called egress network transfer unit 40 at the called user TlnB end. The data transmission takes place at the next higher protocol level according to the TCP (Transmission Control Protocol), see transmission path 42. The signaling data that has been generated to set up the connection for the voice data is transmitted by the control unit 36 according to SIP-T (Session Initiation Protocol—Telephones) to a control unit 44 that serves to control the network transfer unit 40. A control path 46, on which the control data is transmitted according to protocol MCGP or protocol H.248, is positioned between the control unit 44 and the network transfer unit 40. The transfer of the signaling data according to SIP-T is indicated by a transmission path 48, with the signaling data also being transmitted in data packets. The transmission of the signaling data also involves a local service provider computer 50 if necessary, that is also known as a proxy and is used to determine the control unit 44 to be used. When determining the control unit to be used, the local service provider computer 50 establishes a connection 52 to a service provider computer 54 in which the assignment of call numbers to control units is stored.

The user TlnB uses a terminal 56 with the call number 001-893400-5566, i.e. that is located in the USA. The terminal 56 is a telephone that is connected to a switching center 58 by means of an access line 60. Again, there is a user data transmission channel 62 and a signaling channel 64 on the access line 60. The switching center 58 also signals in accordance with ISUP.

The control unit 44 forwards the received signaling data in accordance with the ISUP protocol to a forwarding unit 66 that is part of the interconnected data transmission network 14. A signaling path 68 is used for this purpose. The forwarding unit 66 forwards the signaling data via a signaling path 70 to the switching center 58. For example, the signaling data shows which transmission channel is to be used between the network transfer unit 40 and the switching center 58 on a transmission path 72.

FIG. 2 shows method steps for setting up a connection, whereby the user data is transmitted from the interconnected data transmission network 12 via the Internet 10 to the interconnected data transmission network 14, see also FIG. 1. Processes that refer to the control unit 36, i.e. the ingress control unit, are shown in FIG. 2 by time ray Z0. Processes that refer to control unit 44, i.e. the egress control unit, are shown in FIG. 2 by time ray Z2. Earlier time points lie on the time rays Z0 and Z2 further up than later time points. Equal time points are shown at equal heights.

At time point t0, a connection setup message 100 from the forwarding unit 30 arrives at the control unit 36. The connection setup message 100 is also known as the IAM (Initial Address Message). The connection setup message 100 signals that the user TlnA wishes to set up a voice connection to user TlnB.

At time point t2, that lies after time point t0, the control unit 36 generates a connection setup message 102, also known as the Invite message. The connection setup message 102 has the following content:

---

INVITE sip:+1-893-400-63251@sip01.siemens.de;user=phone SIP/2.0
Via: SIP/2.0/UDP mgc01.siemens.de:5060
From: <sip:+49-89-300-11223@mgc01.siemens.de;user=phone>
To: <sip:+1-893-400-5566@sip01.siemens.de;user=phone>
Call-ID: 1717@mgc01.siemens.de
CSeq: 1 INVITE
Contact: <sip:+49-89-300-11223@mgc01.siemens.de;user=phone>
Supported: isup
Session-Expires: 120
Content-Type: application/sdp
Content-Length: . . .
v=0
o=GATEWAY_I 2890844527 2890844527 IN IP4 mg01.siemens.de
s=Session SDP
c=IN IP4 mg01.siemens.de
t=0 0
m=audio 3456 RTP/AVP 8
a=rtpmap:8 PCMA/8000

---

This means that the connection setup message 100 is not contained in encapsulated form in the connection setup message 102. The meaning of the individual data fields of the connection setup message 102 is given in RFC 2543 or RFC 2543bis. The following examples apply:

The telephone number of the calling user TINA and the Internet address of the control unit 36 are marked in the "From" data field. That the terminal is a telephone is also marked. The destination call number is taken from the connection setup message 100. If, however, call number suppression is activated, the original call number is not transferred to the "From" data field.

The destination call number is contained in a "To" data field. That the terminal is a telephone is also marked. The destination call number was also taken from the connection setup message 100.

An "isup" parameter is given in a "Supported" data field. The "isup" parameter indicates that the control unit 36 supports the ISUP protocol, i.e. particularly additional services or performance features of the ISDN.

Details in accordance with the SDP (Session Description Protocol) are contained in the bottom part of the connection setup message 102, see RFC 2327.

When the connection setup message 102 is received, the control unit 44 also evaluates the "isup" parameter. On the basis of this parameter, the control unit 44 generates a disconnect message 104, in deviation from the previous standards, at time point t4. The disconnect message 104 corresponds essentially to message 401_Unauthorized defined in the SIP. The disconnect message 104 is constructed as follows:

---

SIP/2.0 401 Unauthorized
Via: SIP/2.0/UDP mgc01.siemens.de:5060
From: <sip:+49-89-300-11223@mgc01.siemens.de;user=phone>
To: <sip:+1-893-400-5566@sip01.siemens.de;user=phone>
Call-ID: 1717@mgc01.siemens.de
CSeq: 1 INVITE
Content-Length: . . .
Require: isup
WWW-Authenticate: pgp version="5.0"
    realm="MCI WorldCom SIP-T Partner",
    algorithm=md5,
    nonce=<an appropriate value>

---

In deviation from the SIP, the disconnect message 104 contains the parameter "isup" in the "Require" data field provided in the standard, to indicate that support of the ISUP standard is absolutely necessary for the following signaling. In particular, essential additional performance features of the ISDN are therefore supported.

In a "WWW-Authenticate" data field, the data is given that is necessary for an encrypted transmission of signaling messages from control unit 36 to control unit 44. The "WWW-Authenticate" data field contains four data fields whose meaning is defined in the SIP. Thus, version 5.0 is given as the version of the encryption method. The name of control unit 44, i.e. "MCI WorldComSIP-T Partner", is given as the name of the unit that is to receive the encrypted data. A value for performing a so-called challenge-response procedure is given in a "nonce" data field.

After receipt of the disconnect message 104, the control unit 36 confirms the receipt of this message at time point t6 and thus the disconnection by an acknowledgement message 106, also known as the ACK message. The acknowledgement message 106 is transmitted to the control unit 44.

At time point t8, the control unit 36 again generates a connection setup message 108, also known as the invite message, that has the following construction.

```
INVITE sip:+1-893-400-63251@ss2.wcom.com;user=phone SIP/2.0
Via: SIP/2.0/UDP mgc01.siemens.de:5060
From: <sip:+49-89-300-11223@mgc01.siemens.de;user=phone>
To: <sip:+1-893-400-5566@ss2.wcom.de;user=phone>
Call-ID: 1717@mgc01.siemens.de
CSeq: 1 INVITE
Contact: <sip:+49-89-300-11223@mgc01.siemens.de;user=phone>
Supported: isup
Encryption: pgp version="5.0"
Session-Expires: 120
Content-Length: . . .
Content-Type: message/sip
Authorization: pgp version="5.0",
    realm="MCI WorldCom SIP-T Partner",
    nonce=<an appropriate value>,
    signature=<an appropriate value>
------------------------------------
WWW-Authenticate: pgp version="5.0"
    realm="Siemens SIP-T Partner",
    algorithm=md5,
    nonce =<an appropriate value>
content-Type: multipart/mixed; boundary=unique-boundary-1
MIME-Version: 1.0
--unique-boundary-1
Content-Type: application/SDP; charset=ISO-10646
v=0
o=GATEWAY_I 2890844527 2890844527 IN IP4 mg01.siemens.de
s=Session SDP
c=IN IP4 mg01.siemens.de
t=0 0
m=audio 3456 RTP/AVP 8
a=rtpmap:8 ?PCMA/8000
--unique-boundary-1
Content-Type: application/ISUP; version=nxv3; base=itu-t92+
Content-Disposition: signal; handling=optional
01 00 20 00 0a 03 02 0a 08 84 90 81 39 04 50
65 06 0a 09 84 13 94 98 03 10 21 32 03 31 02
00 a0 39 02 31 00 20 03 AB CD EF 00
--unique-boundary-1--
------------------------------------
```

The data fields of the head of the connection setup message 112, i.e. data fields "INVITE" to "Session-Expires" agree essentially with the data fields of the same name in connection setup message 102, and therefore reference is made to the above explanations. The "Content-Type" data field, however, contains the "Message/sip" information.

In addition, the connection setup message 108 has an "Authorization" data field containing details of the encryption method and the information contained in the disconnect message 104 is repeated, but the "Algorithm" data field is not given. With the aid of the name given in the "realm" data field, the control unit 36 determines a public digital key of control unit 44 and uses it for the encryption explained in the following. Furthermore, the "Authorization" data field contains a "Signature" data field in which a password or a digital signature of control unit 36 for the encrypted transmitted data is stored. A private digital key of control unit 36 is used to generate a digital signature. The correctness of the signature can be checked in control 44 by using a corresponding public key of control unit 36. The part of the connection setup message 108 shown between the dotted lines is encrypted and also contains the following:

A "WWW-Authenticate" data field in which the data provided in the SIP for specifying an encryption method is contained, with which encrypted data can be transmitted to the control unit 36. In particular, the name "Siemens SIP-T Partner" of control unit 36 is given, with the help of which a necessary public digital key of control unit 36 can be determined.

The details in accordance with the SDP, already contained in the connection setup message 102, are contained in a central part of the encrypted section.

A copy of the connection setup message 100, i.e. of the IAM, is transmitted in the bottom part of the encrypted part. The content of the connection setup message 100 is given in hexadecimal notation and corresponds to the ISUP standard. For example, the first hexadecimal number "01" shows that it is an IAM.

After receipt of the connection setup message 108, the control unit 44 contains the encrypted signaling data and checks the signature or password. The password was, for example, agreed between the network operators of the data transmission networks 12 and 14 before implementing the method. If the signaling data can be decrypted and the authorization check shows that the data comes from an authorized device, i.e. from control unit 36, control unit 44 generates a continuation message 110, also known as 100_Trying, at time point t10, that is used to signal that control unit 44 has instigated a connection setup to user TlnB. The continuation message 110 is transmitted from control unit 44 via the Internet 10 to control unit 36.

At time point t12, control unit 44 generates a connection setup message 112 in accordance with the ISUP protocol, also known as the IAM (Initial Address Message). Connection setup message 112 and connection setup message 110 agree. The connection setup message 112 is directed to the forwarding unit 66.

At time point t14, control unit 44 receives an ACM message 114 in accordance with the ISUP from the forwarding unit 66. The ACM message 114 signals that a complete destination call number has been received.

On the basis of the ACM message 114, the control unit 44 generates a connection continuation message 116 in accordance with the SIP. The connection continuation message 116 is also known as 183_Session_Progress and is sent to the control unit 36. Because a check has already been made in control unit 44 that the control unit 36 is an authorized control unit, signaling messages can now be transmitted in unencrypted form to control unit 36. The connection continuation message 116 therefore contains the ACM message 114 in unencrypted form. Furthermore, the connection continuation message 116 contains a data field in which a digital signature or a password of control unit 44 is given.

Connection continuation message 116 is received at time point t16 in control unit 36. The authorization of control unit 44 is checked in control unit 36. If control unit 44 is not authorized, the connection setup is discontinued. Otherwise, the transmitted signaling message can be accepted as an ACM message 118. The ACM message 118 is transmitted to the forwarding unit 30.

The following signaling messages for setting up a connection correspond to the ISUP standard or the SIP-T. Thus, at time t18 a continuation message 120, also known as a CPG (Call Progress) message, is received and shows that a signal tone, e.g. a ring tone, with which the user TlnB is being called, is being generated at terminal 56. Following the receipt of the continuation message 120, a signal tone message 122 is generated shortly after time point t 18, that is also known as 180_Ringing. The signal tone 122 is received in the control unit 36. A continuation message 124, also known as a CPG (Call Progress) message is generated at time point t20 on the basis of the signal tone message 122.

An ANM (Answer Message) arrives at control unit 44 at time point t22, which signals that the user TlnB has lifted the receiver of his terminal 56. On the basis of the ANM message 126, the control unit 44 generates an OK message, known according to SIP as 200_OK, and transmits it to the control unit 36.

After receipt of the OK message 128, the control unit 36 generates an ANM message 130 according to the ISUP standard. A frame 132 indicates that voice data is now being exchanged during a conversation between user TlnA and user TlnB. At time point t26 the conversation is ended and the control unit 36 transmits a confirmation message 34 to control unit 44 to confirm the end of the conversation.

The method explained with the aid of FIG. 2 is performed if no additional performance feature or no essential additional performance feature is requested. If on the other hand an essential performance feature is requested, e.g. a close user group, then in place of the connection setup message 102 a connection setup message is sent in which the "isup" parameter is contained in a "Require" data field and not in the "Supported" data field. The other steps of the method remain the same.

There are also differences in a case where the connection setup message 102, or its corresponding message, arrives not at a control unit 44 but instead at the terminal of a user of the Internet 10.

In accordance with standard RFC 2543 or RFC 2543bis, the terminal of an IP user must break off the connection by a message 420 (Bad Extension) if the parameter "isup" is transmitted in the "Require" data field. If on the other hand the parameter "isup" is contained in the "Supported" data field, the connection setup can be continued as between two IP terminals, but with no essential additional performance features in accordance with the ISUP standard being supported. The calling control unit 36 must thus guarantee that the connection setup is broken off if either the disconnect message 104, i.e. the message 401_Unauthorized, or a message 420 (Bad Extension) is received.

FIG. 3 shows the construction of the control unit 36. Control unit 36 contains the receiver unit 150, a control unit 152 and a transmitter unit 154. The receiver unit 150 is used to receive messages from the forwarding unit 30 or from the Internet 10, for example to receive connection setup message 100 or the disconnect message 104. The received messages are forwarded from the receiver unit 150 to the control unit 152, see arrow 156.

Using the method steps explained by means of FIG. 2, the control unit 156 generates follow-up messages for the received messages and controls the control unit 154 so that these messages are transmitted in accordance with the method steps explained in FIG. 2, see arrow 158.

The transmitter unit 154 transmits messages to the forwarding unit 30 or to the Internet 10, for example the ACM message 118 and the connection setup message 102.

FIG. 4 shows the construction of the control unit 44. The control unit 44 contains a receiver unit 170, a control unit 172 and a transmitter unit 174.

The receiver unit 170 is used to receive messages from the Internet 10 or from the forwarding unit 66, for example to receive connection setup message 102 or receive the ACM message 114. The receiver unit 170 forwards the received messages to the control unit 172, see arrow 176.

Control unit 172 performs the method steps relating to control unit 44, as explained above using FIG. 2, and generates follow-up messages on the basis of the received messages. The control unit 172 controls control unit 174 so that the follow-up messages arrive at the correct receiver, see arrow 178.

The transmitter unit 174 transmits the messages meant for control unit 36 to the Internet or the messages meant for the forwarding unit 66, for example the disconnect message 104 or the connection setup message 112.

The function of the receiver unit 150 or 170, of the control unit 152 or 172 and the transmitter unit 154 or 174 can be provided by circuit arrangements that perform no programs. However, with a different example of an embodiment, a processor P1 or P2 and a storage unit SP1 or SP2 are used to provide the functions of the receiver unit 150 or 170, of the control unit 152 or 172 and of the transmitter unit 154 or 174.

In a different example of an embodiment, the PGP (Pretty Good Privacy) method is not used as the encryption method, but instead a different method of encryption is used. Furthermore, with different examples of the embodiment a different choice of data fields that are to be transmitted encrypted or unencrypted is made.

The invention claimed is:

1. A method for the transmission of signaling messages, comprising:
   transmitting data between an interconnected data transmission network and a data packet transmission network;
   receiving an original signaling message that is defined for an interconnected data transmission and has signaling data for the data transmission; and
   transmitting a partner signaling message that is defined for the received original signaling message and is suitable for the transportation of the original signaling message via the data packet transmission network but does not contain the original signaling message, wherein the partner signaling message includes a message element that indicates the participation of an interconnected data transmission network, and the partner signaling message includes the signaling data from the original signaling message that is necessary for signaling to a terminal of the data packet transmission network that other signaling data from the original signaling message is not contained in the partner signaling message,
   wherein a check is made to determine whether additional performance features of the interconnected data transmission network that must be supported by the opposing side are required in the original signaling message or whether such essential performance features are not requested, and depending on the results of the check the partner signaling message has an indication that the additional performance features are supported by the transmitter of the partner signaling message but do not have to be supported by the receiver of the partner signaling message.

2. The method in accordance with claim 1, wherein the partner signaling message contains an indication that support of essential additional performance features of the interconnected data transmission network is also necessary in the receiver of the partner signaling message.

3. The method in accordance with claim 2, wherein a response message is generated in a unit that supports no additional performance features of the interconnected data transmission network.

4. The method in accordance with claim 3, wherein a response message is generated in a unit that supports essential additional performance features of the interconnected data transmission network regardless of the type of indication.

5. The method in accordance with claim 4, wherein in a unit that supports additional performance features of the interconnected data transmission network a rejection message is generated as a response message with which the partner signaling message is rejected.

6. The method in accordance with claim 5, wherein the rejection message also has a message element that indicates the participation of an interconnected data transmission network.

7. The method in accordance with claim 5, wherein the rejection message has an indication that essential additional performance features of the interconnected data transmission network must be supported.

8. The method in accordance with claim 6, wherein security data is transmitted from the receiver of the partner signaling message to the transmitter of the partner signaling message in the response message or in a message following the response message, and after receipt of the response message an additional partner signaling message is generated that has the original signaling message in an electronically encrypted form in accordance with the security data.

9. The method in accordance with claim 8, wherein the additional partner signaling message is transmitted before an authorization of the receiver of the additional partner signaling message has been checked.

10. The method in accordance with claim 9, wherein authorization data is transmitted from the transmitter of the partner signaling message to the receiver of the partner signaling message in the additional partner signaling message.

11. The method in accordance with claim 10, wherein the authorization data is checked after receipt of the encrypted original signaling message, and depending on the check of the authorization data the original signaling message is also used for signaling or is discarded.

12. The method in accordance with claim 11, wherein security data is transmitted from the transmitter of the partner signaling message to the receiver of the partner signaling message and that from the receiver of the partner signaling message at least one additional signaling message that is defined for interconnected data transmission is transmitted to the transmitter of the partner signaling message in an encrypted form in accordance with additional security data.

13. The method in accordance with claim 12, wherein additional authorization data is transmitted together with the additional security data from the receiver of the partner signaling message to the transmitter of the partner signaling message, wherein the additional authorization data is checked, and wherein additional signaling message is used for signaling or is discarded.

14. The method in accordance with claim 13, wherein the authorization data contains a password.

15. The method in accordance with claim 13, wherein the authorization data contains an electronic signature.

* * * * *